United States Patent [19]

Best

[11] 4,017,095

[45] Apr. 12, 1977

[54] FIFTH WHEEL CONNECTION FOR A TRACTOR-TRAILER COMBINATION

[75] Inventor: William J. Best, Naperville, Ill.

[73] Assignee: Clark Equipment Company, Buchanan, Mich.

[22] Filed: Nov. 19, 1975

[21] Appl. No.: 633,187

[52] U.S. Cl. .............................. 280/438 R; 280/474
[51] Int. Cl.² ......................................... B62D 53/10
[58] Field of Search ...... 280/433, 434, 432, 423 R, 280/438 R, 474

[56] References Cited

UNITED STATES PATENTS

| | | | |
|---|---|---|---|
| 1,990,731 | 2/1935 | Greer | 280/423 R |
| 2,038,265 | 4/1936 | Bradley | 280/423 R |
| 2,126,597 | 8/1938 | Zeilman | 280/438 R |
| 2,553,959 | 5/1951 | Cook et al. | 280/432 X |
| 2,602,674 | 7/1952 | Harris | 280/474 X |
| 2,656,195 | 10/1953 | Martin | 280/438 R |
| 2,838,324 | 6/1958 | Dalton | 280/433 X |
| 3,788,673 | 1/1974 | Gloege | 280/423 R |

FOREIGN PATENTS OR APPLICATIONS 700,209 2/1931 France .............................. 280/433

Primary Examiner—Philip Goodman
Assistant Examiner—John A. Pekar
Attorney, Agent, or Firm—Harry G. Thibault

[57] ABSTRACT

A slip-proof connection provided between the tractor and trailer of a tractor-trailer combination for carrying the superstructure of a mobile crane. The connection or mechanism comprises a mounting assembly secured to the tractor bed, a mounting plate carried on the front portion of the trailer supporting the crane superstructure, and means for cooperatively interconnecting the two mechanisms to assure an interlocked connection therebetween. The connecting mechanism comprises a positive interlock wherein a mounting post carried on the mounting plate on the tractor is received into a complementary opening provided in the mounting plate on the front end of the trailer, and a sleeve is then mounted on the mounting post and positively locked in position to hold the tractor and trailer locked together. Although the combination does not provide for the quick disconnect of the tractor from the trailer as is common with typical fifth wheel designs, it does permit articulation of the tractor and trailer combination. Further, means are provided in association with the connecting mechanism to permit oscillation of the tractor and trailer in multiple oscillatory modes. Additionally, locking means are provided on the mounting assembly to retain multiple oscillatory modes for rough terrain movement and to lock out one of the oscillatory modes for highway travel.

11 Claims, 4 Drawing Figures

FIFTH WHEEL CONNECTION FOR A TRACTOR-TRAILER COMBINATION

BACKGROUND OF THE INVENTION

Field of the Invention

The present invention relates to a mechanical connection between a tractor-trailer combination and in particular a mechanical connection providing for articulation of the tractor and trailer of a vehicle supporting the superstructure of a mobile crane.

A tractor-trailer combination of the type with which the present invention is concerned includes a powered tractor and a trailer connected thereto, the trailer adapted to support the superstructure of a mobile crane. Further, an extensible boom assembly is attached to the superstructure. In operation, the tractor is secured to the trailer by a reciprocating connection providing for relative movement therebetween. The connection provides for highway transport of the crane's superstructure from one job site to another as well as the on-site movement of the crane structure from one part of the job site to another under typically rough terrain conditions. Typically, the connection between tractor and trailer has been of the quick disconnect type.

Known Systems

The "quick-disconnect" mechanism for a tractor-trailer combination provides a tractor mounting assembly comprising a tractor mounting plate having a self-aligning rear slot which receives a pin associated with a mounting plate on the trailer. As implied, the components of the combination are easily coupled and decoupled. There is substantial relative movement therebetween, but there is little cooperative interaction save the actual hauling of the trailer by the tractor from site to site.

For example, in order to operate the crane mounted on the trailer portion of the combination, it is necessary to mount the crane's superstructure on its outriggers in the fully operative position to perform any substantial loading functions for the crane. The tractor is not cooperatively engaged with the crane during its operating cycle.

If it is desired to utilize the tractor during the operating cycle of the crane, the connection between tractor and trailer should be made slip-proof, permitting articulation between tractor and trailer and eliminating relative vertical movement between the tractor and trailer portions of the mechanism without eliminating the relative oscillatory movement of the combination. Such considerations would preclude the use of the quick-disconnect type of connection shown in the prior art.

A further consideration is the operation of the truck and trailer combination over both highway and rough terrain. It may be desirable to provide for relative oscillation between the tractor and trailer under rough terrain conditions; that is, providing for both the side-to-side oscillations normally experienced under rough terrain conditions as well as the back and forth oscillations produced while traveling forward, to permit self-leveling of the individual components of the combination. However, under highway conditions it is desirable to eliminate the side-to-side oscillatory motion to maximize highway stability of the tractor-trailer combination.

SUMMARY OF THE INVENTION

In the present invention, the mechanical connection between the tractor and the trailer supporting the crane's superstructure includes a mounting assembly carried on the tractor, a mounting pin receiving assembly carried on the trailer and a locking mechanism cooperatively interconnecting the two assemblies to secure the combination for articulated movement. Further, the improved connection provides for cooperative engagement between tractor and trailer so that the tractor becomes part of the crane operating mechanism under loading conditions, providing sufficient additional stability in the small to medium load range so that it is not necessary to extend the outriggers during the operating load of the crane in the above stated load range.

The tractor portion of the mechanism comprises a mounting pin assembly including a pair of horizontally spaced mounting brackets having complementary axially aligned openings respectively provided therein, a beam assembly extending between the two bracket assemblies and having opposite ends trunnion mounted on the bracket assemblies. A mounting table assembly is pivotally mounted on the beam assembly, the mounting table assembly including a shaft passing through a mid-portion of the beam assembly perpendicular to the longitudinal axis of the beam assembly and a pair of mounting table supports disposed on opposite sides of the beam assembly and pivotally mounted on opposite ends of the shaft. The mounting table is suitably secured to the upper ends of the supports, as by welding. A mounting post is provided in the center of the mounting table extending upright and perpendicular therefrom and welded thereto.

The mechanism is further characterized by a mounting plate associated with the trailer portion of the combination, the mounting plate comprising basically a flat plate provided at a forward end of the trailer having a central opening therein, that opening receiving the mounting post carried on the mounting table of the lower assembly. With the trailer mounting plate resting in place on the tractor mounting table, a locking sleeve is slid on to the mounting post to engage the upper surface of the trailer mounting plate and a pair of bolts are passed through openings provided in the sleeve and complementary openings provided in the mounting post and secured in place to rigidly couple the tractor and trailer in assembled relation.

The beam assembly carried on the mounting brackets mounted on the tractor bed provides for relative to-and-fro oscillatory motion between the tractor and trailer combination. The mounting table assembly including the supports mounted on the shaft passing through the mid portion of the beam assembly cooperate with that shaft to provide oscillatory side-by-side motion for the combination under rough terrain conditions.

Since it is desirable to lock out side-to-side oscillatory motion under highway travel conditions for the tractor-trailer combination, lock out mechanisms are provided under the mounting table for accomplishing the desired purpose. Pneumatically actuated cylinders are cooperatively connected to respective lock out blocks carried in respective channels provided on the under surface of the mounting table. When the pneumatic cylinders are actuated the lock out blocks are extended to be interposed between the mounting table and the beam assembly to thus eliminate side-to-side oscillatory motion of the tractor-trailer combination.

Other features and advantages of the present invention will be apparent to persons skilled in the art from the following detailed description of a preferred embodiment accompanied by the attached drawing wherein identical reference numerals will refer to like parts and various views.

DETAILED DESCRIPTION OF A PREFERRED EMBODIMENT

A connecting mechanism constructed in accordance with the present invention may be used to connect the tractor and trailer of a tractor-trailer combination hauling a crane superstructure of the type disclosed in our earlier filed application Ser. No. 547,679 entitled "System and Method for Automatic Unstowing and Stowing of a Crane Boom", filed Feb. 6, 1974 and assigned to the assignee of the present invention.

Figure 1:
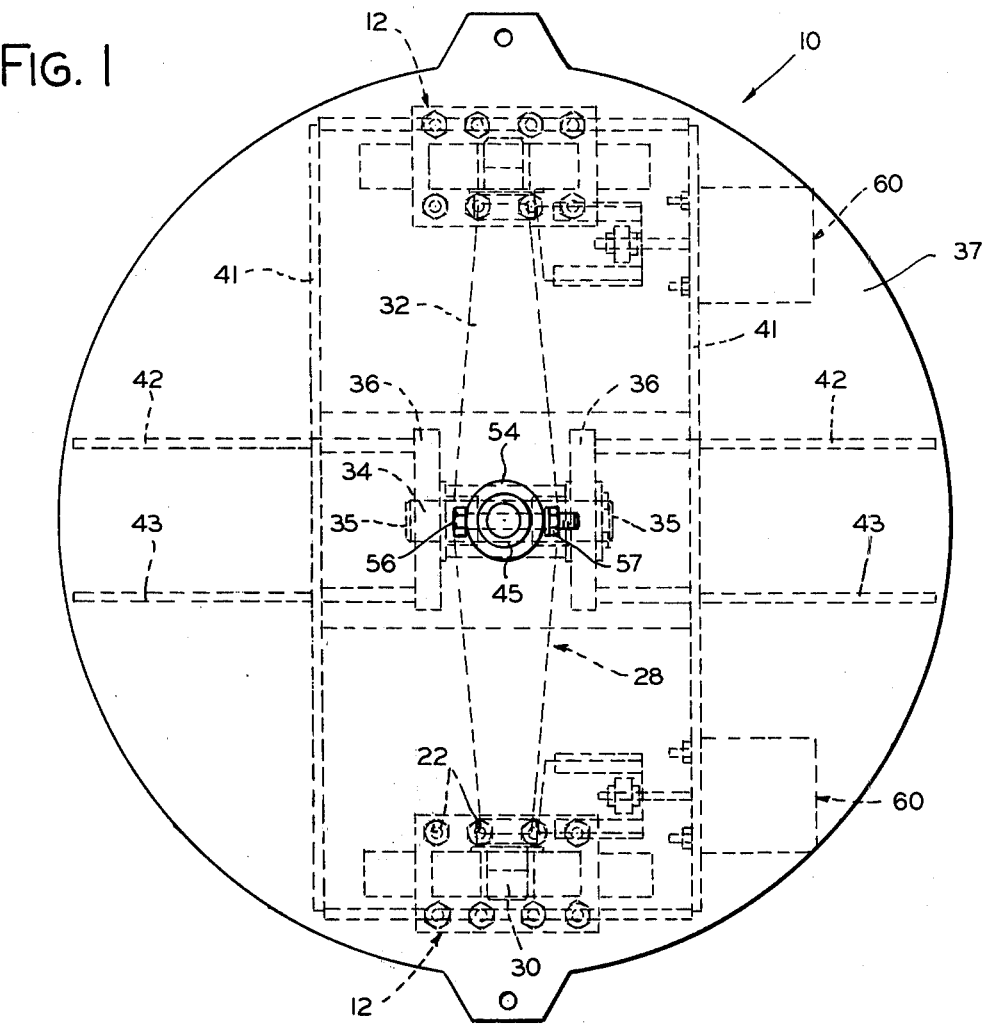
FIG. 1 is a top plan view of a lower portion of the connecting mechanism of the present invention.
Figure 2:
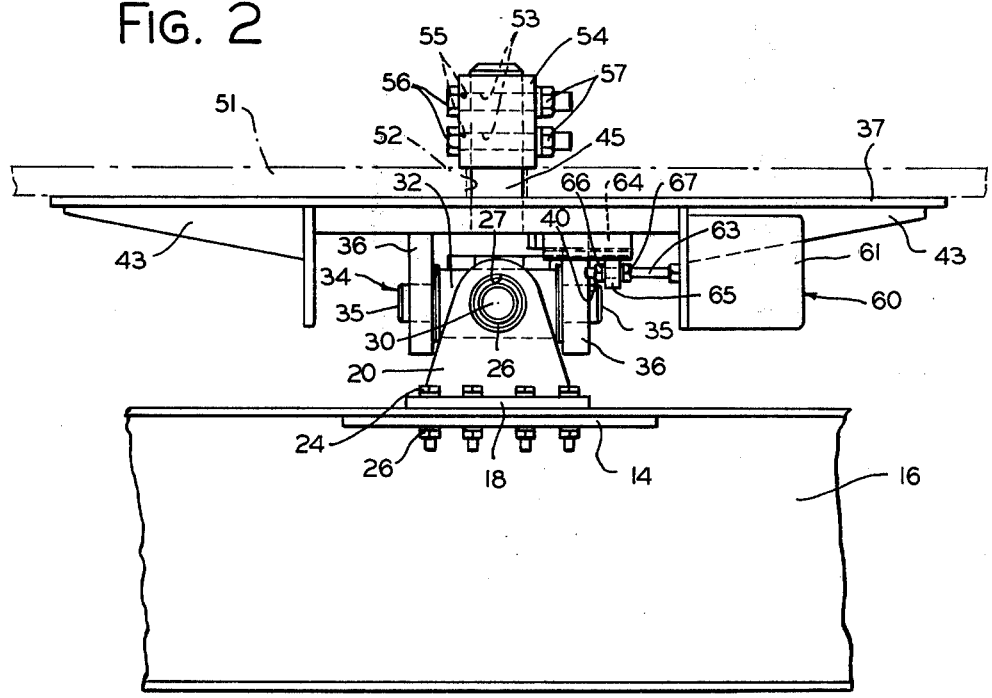
FIG. 2 is a side elevational view of the connecting mechanism of the present invention with the top portion of the connecting mechanism associated with the trailer of the combination being shown in phantom.
Figure 3:
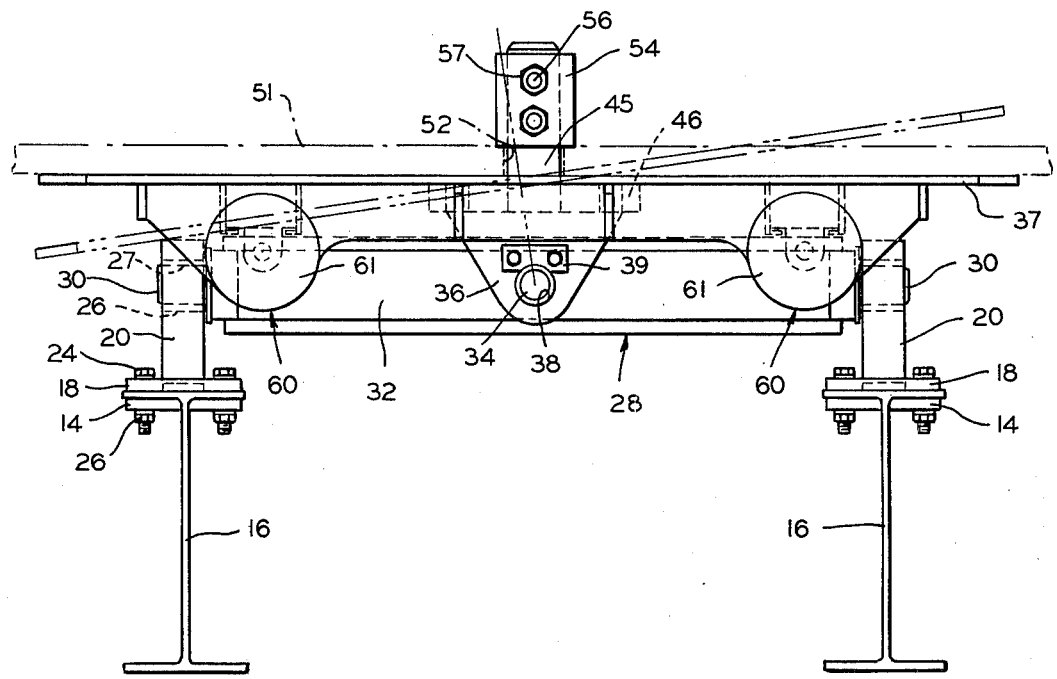
FIG. 3 is a rear elevational view of the lower portion of the connecting mechanism of the present invention including a schematic showing of the method of connecting the lower portion of the mechanism to the tractor bed, the representation in phantom lines indicating the amount of side-to-side oscillatory motion permitted by the connecting mechanism.
Figure 4:
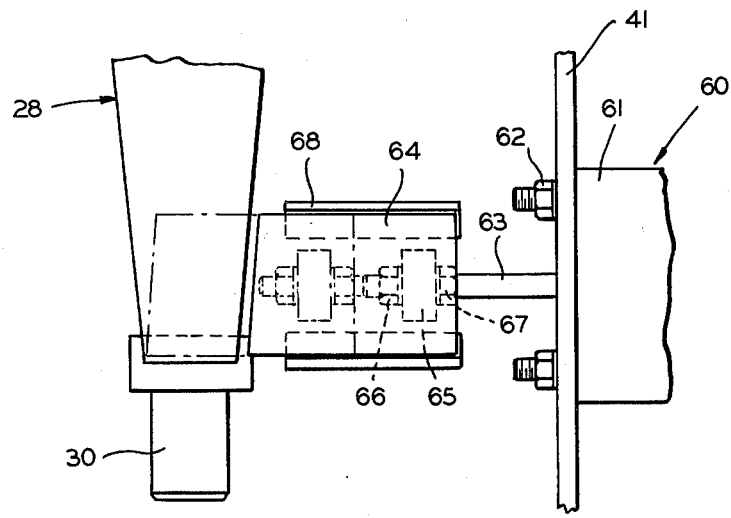
FIG. 4 is a detailed sectional view taken generally along the lines 4—4 of FIG. 2.

A fifth wheel mechanism 10 constructed in accordance with the present invention comprises a pair of horizontally spaced mounting brackets 12, mounted on the bed 14 of a tractor (not shown) of a tractor-trailer combination. Preferably the mounting bracket 12 is aligned with a supporting member of the tractor bed such as the I-beam 16 as best shown in FIG. 3. The bracket 12 comprises a bottom plate 18 having an upright 20 welded thereto and generally aligned along the longitudinal centerline of the plate 18. A series of spaced openings 22 are provided along opposite longitudinal edges of the plate 18 and adjacent the upright 20. Bolts 24 pass through the openings 22 and the plate 18 as well as complementary openings provided in the I-beam 16 and the trailer bed 14 to be engaged by nuts 26 which are threaded thereon to secure the brackets 12 in assembled relationship on the trailer bed 14. The upright 20 is a generally triangular support having a rounded upper corner and having therein an opening 26 providing a bearing surface 27. Horizontally spaced from the first mounting bracket 12 is a second mounting bracket 12 having its opening 26 axially aligned with the opening 26 in the first mounting bracket 12. Trunnion mounted on the brackets 12 is a beam assembly 28 having opposite ends 30 received in openings 26 in the uprights 20, the ends 30 freely rotatable on the bearing surfaces 27. A beam portion 32 of the beam assembly 28 tapers outwardly from respective end portions toward the center thereof as shown in FIG. 1. At the center of the beam portion 32, an opening is provided for receiving a mounting shaft 34 of the beam assembly 28. The mounting shaft 34 has opposite ends 35 which protrude outwardly of the beam 32. Carried on the outer ends of the shaft 34 are a pair of table supports 36. The table supports 36 comprise a pair of horizontally spaced arms which are welded to the undersurface of a mounting table 37 at the upper end thereof and have mounting holes 38 at the lower end thereof which receive the shaft 34 of the beam assembly 28. To retain the shaft 34 in place a retainer plate 39 is bolted to an outer side of one of the arms 36, the retainer plate 39 engaging a slot 40 provided in the shaft 34. The mounting table 37 is carried on the supports 36 for oscillatory motion in two modes, the motion front-to-back provided by the beam assembly 28 carried in the mounting brackets 12, and the oscillatory motion side-to-side provided by the combination of the pivotal shaft 34 and the supports 36 associated with and connected to the mounting table 37. The table 37 is reinforced by the addition of gusset plates as shown in FIGS. 1 and 2 for improvement of weight bearing capabilities with gusset plates 41 being longitudinally coextensive with the beam assembly 28, in parallel spaced relation thereto and on opposite sides thereof. Additional gusset plates 42 and 43, which are generally parallel with the longitudinal axis of the pivotable shaft 34 and spaced outwardly therefrom are also provided on the underside of the mounting table 37 for reinforcement purposes.

Extending outwardly from the center of the mounting table 37 is a center post or mounting post 45 suitably secured to the mounting plate 37 as by welding. In the preferred embodiment shown in FIG. 3 the mounting post 45 passes through an opening provided in the mounting table 37 to be welded to a support bracket 46 suitably secured to the underside of mounting table 37.

Received on the post 45 is a trailer mounting plate 51 having a central opening 52 therein. The opening 52 is simply a circular hole provided in the plate 51 of the diameter sufficient to snugly engage the post 45 of the mounting assembly 10. A pair of openings 53 generally perpendicular to the vertical axis of the post 45 pass therethrough at respective openings somewhat above the upper surface of the plate 51. A mounting sleeve 54 is provided for the post 45 the sleeve having an inside diameter slightly larger than the diameter of the mounting post 45 and having openings 55 therein complementary to and generally aligned with the openings 53 in the post 45 in the installed position. With the sleeve 54 mounted on the post 45 bolts 56 may be inserted into openings 53 and 55 to pass therethrough and to be secured in place by complementary nuts 57 which retain the sleeve 54 on the post 45 and hold the mounting table 37 carried on the tractor bed 14 and the mounting plate 51 carried on a forward portion of the trailer secured in place.

It should be noted that the mounting post 45 could be threaded and the mounting sleeve 54 replaced by a nut threadable on the post, to secure the tractor and trailer in assembled relation.

With the connection between connector and trailer engaged, the tractor-trailer combination can act as an articulated vehicle, that is, there is relative pivotal movement between the tractor and the trailer by virtue of the pivotal connection provided at the mounting post 45 on the tractor and the mounting hole 52 on the trailer. In addition, the pivotal connection of the mounting shaft 34 on the beam assembly 28 provides side-to-side oscillatory motion of the tractor-trailer combination. Further, the combination of the beam assembly 28 and the brackets 12 provide back-and-forth oscillatory motion of the tractor-trailer combination about the bearing surface 27.

When the tractor-trailer combination is traveling over rough terrain, it may be desirable for oscillatory motion in two modes, but when the combination is traveling on the highway from one job site to another, it is desirable to maximize stability of the tractor-trailer combination due to the substantial weights of the assemblies involved. In this connection, there is provided a pair of lockout mechanisms 60. The lockout mechanisms 60 are symmetrically mounted with respect to the longitudinal centerline of the mounting table 37 and only one need be described in detail. Each mechanism 60 is mounted inboard of its respective mounting bracket 12. Each lock-out mechanism 60 comprises a pneumatic cylinder 61 appropriately mounted as by nut and bolt combinations 62 to the rear gusset plate 41 of the mounting table 37. A connecting rod 63 has one end appropriately secured to the pneumatic cylinder 61 and an opposite end secured to a lockout block 64 through an ear 65 provided on a lower surface of the lockout block 64, the ear 65 being secured to the connecting rod 63 by lock nuts 66 and 67. The lockout block 64 is carried within a channel 68 appropriately welded to the underside of the mounting table 37, the sides of the channel being in parallel alignment with the axis of the connecting rod 63. To lock out the side-to-side oscillatory motion of the mechanism 10 of the tractor-trailer combination. air may be supplied to the pneumatic cylinder 61 from a source (not shown) provided in the tractor to activate the lockout mechanism 60 and urge the lockout blocks 64 forward to rest between the underside of the mounting table 37 and the upper surface of the transverse beam 32. This positioning of the lockout block effectively eliminates the side-to-side oscillatory motion of the tractor-trailer combination. Under rough terrain conditions the pneumatic cylinder may be de-actuated to withdraw the lockout block 64 from between the mounting table 37 and the beam 32 to restore oscillatory side-to-side motion to the connecting mechanism 10. The mechanism 60 could of course lock out oscillatory motion of the table 37 with the cylinder 61 in a de-actuated position, as by spring means provided therein, the cylinder 61 being actuated to compress the spring and withdraw the block 64 to permit oscillatory motion of the table 37.

Thus, the present invention provides a means for securing a tractor-trailer combination in interlocked relationship permitting the use of the combination as an articulated vehicle having relative pivotal movement between the components of the combination. Further, the connecting mechanism provides for oscillatory motion in two modes of direction for rough terrain conditions. Additionally, means are provided to automatically alter the oscillatory motion of the tractor-trailer combination from two modes of oscillation to one mode of oscillation for over-highway travel to increase the stability of the combination on the highway.

Having thus described in detail a preferred embodiment of the invention, persons skilled in the art will be able to modify certain of the structure that has been illustrated and to substitute equivalent elements for those which have been disclosed, and it is, therefore, intended that all such modifications and substitutions be covered as they are embraced within the scope of the appended claims.

I claim:
1. A connecting mechanism provided between a tractor-trailer combination, said connecting mechanism comprising a first mounting portion including a bracket assembly mountable on a rear bed portion of the tractor, a beam assembly transversely mounted on the bracket assembly for relative pivotal movement therebetween, a mounting table assembly mounted on the beam assembly for pivotal movement transverse to the pivotal movement of the beam assembly, a mounting post extending outwardly from an upper surface of a mounting table associated with the mounting table assembly, a second mounting portion provided on the trailer including a connecting plate suitable for engagement with the first mounting portion of the connecting mechanism provided on the tractor, the connecting plate including a central hole receivable on the mounting post and a retaining mechanism mountable on the post after the connecting plate is mounted thereon and suitably engaging the mounting table, said mechanism comprising a sleeve receivable on the mounting post and means to lock the sleeve to the post, the mechanism retaining the mounting table and the connecting plate is connected cooperative relationship to provide relative pivotal movement therebetween.

2. The connecting mechanism as claimed in claim 1 wherein the locking means comprises openings provided in the mounting post transverse to the vertical axis thereof, complementary openings provided in the mounting sleeve, and bolts passing through the openings and securable therein to lock the mounting sleeve on the mounting post.

3. A connecting mechanism as claimed in claim 1 wherein the bracket assemblies comprise a pair of mounting brackets generally aligned in horizontally spaced relationship having respective upper openings axially aligned, the beam assembly further comprising a longitudinal beam having opposite ends trunnion mounted in the openings in the bracket assemblies for relative pivotal movement therebetween.

4. A connecting mechanism as claimed in claim 1 wherein the mounting table assembly comprises a mounting shaft rigidly secured in the beam assembly at a mid portion thereof and extending transverse to the longitudianal axis of the beam assembly, a mounting table support having a lower end receivable on the mounting shaft carried in the beam assembly, an upper end rigidly secured to the mounting table, the mounting table support being pivotally mounted on the mounting shaft so as to permit relative pivotal movement between the beam assembly and the mounting table transverse to the pivotal movement of the beam assembly and its associated mounting brackets.

5. A connecting mechanism as claimed in claim 1 including means for limiting the pivotal movement of the mounting table.

6. A connecting mechanism as claimed in claim 5 wherein the means for limiting the pivotal movement of the mounting table comprise a lockout block retained on the underside of the mounting table and means for providing reciprocal of the lockout block to permit selective engagement and disengagement of the lockout block within the space provided between the underside of the mounting table and the upper surface of the beam assembly to prevent relative movement therebetween.

7. A connecting mechanism as claimed in claim 6 wherein the reciprocating means comprises a pneumatic cylinder mounted on the underside of the mounting table, a connecting rod connected between the lockout block and the pneumatic cylinder to communicate reciprocal movement delivered by the cylinder to the lockout block, and means at the opposite end of the connecting rod connecting the block thereto.

8. A connecting mechanism as claimed in 7 wherein the lockout mechanism further includes guide means for the lockout block, said guide means comprising a channel in which the lockout block is carried for reciprocable movement between a disengaged position permitting relative oscillatory movement between the mounting table and the beam assembly of the connecting mechanism and an engaged position locking out said oscillatory movement.

9. A connecting mechanism provided between a tractor-trailer combination, said connecting mechanism comprising a first mounting portion including a bracket assembly mountable on a rear bed portion of the tractor, a beam assembly transversely mounted on the bracket assembly for relative pivotal movement therebetween, a mounting table assembly mounted on the beam assembly for pivotal movement transverse to the pivotal movement of the beam assembly, a mounting post extending outwardly from an upper surface of a mounting table associated with the mounting table assembly, a second mounting portion provided on the trailer including a connecting plate suitable for engagement with the first mounting portion of the connecting mechanism provided on the tractor, the connecting plate including a central hole receivable on the mounting post, a retaining mechanism mountable on the post after the connecting plate is mounted thereon and suitably engaging the mounting table, said mechanism retaining the mounting table and the connecting plate in connected cooperative relationship to provide relative pivotal movement therebetween, and means for limiting the pivotal movement of the mounting table comprising a lockout block retained on the underside of the mounting table and means for providing reciprocal movement of the lockout block to permit selective engagement and disengagement of the lockout block within the space provided between the underside of the mounting table and the upper surface of the beam assembly to prevent relative movement therebetween.

10. A connecting mechanism as claimed in claim 9 wherein the reciprocating means comprises a pneumatic cylinder mounted on the underside of the mounting table, a connecting rod connected between the lockout block and the pneumatic cylinder to communicate reciprocal movement delivered by the cylinder to the lockout block, and means at the opposite end of the connecting rod connecting the block thereto.

11. A connecting mechanism as claimed in claim 10 wherein the lockout mechanism further includes a guide means for the lockout block, said guide means comprising a channel in which the lockout block is carried for reciprocable movement between a disengaged position permitting relative oscillatory movement between the mounting table and the beam assembly of the connecting mechanism and an engaged position locking out said osciallatory movement.

* * * * *